United States Patent
Goranson

(10) Patent No.: US 10,332,562 B2
(45) Date of Patent: Jun. 25, 2019

(54) SYSTEM AND METHOD FOR SPACE-TIME ANNOTATION-CAPABLE MEDIA SCRUBBING

(71) Applicant: Sirius-Beta Corporation, Virginia Beach, VA (US)

(72) Inventor: Harold T. Goranson, Virginia Beach, VA (US)

(73) Assignee: Sirius-Beta Corporation, Virginia Beach, VA (US)

( * ) Notice: Subject to any disclaimer, the term of this patent is extended or adjusted under 35 U.S.C. 154(b) by 451 days.

(21) Appl. No.: 14/740,528

(22) Filed: Jun. 16, 2015

(65) Prior Publication Data

US 2015/0279425 A1 Oct. 1, 2015

Related U.S. Application Data

(63) Continuation-in-part of application No. 13/290,439, filed on Nov. 7, 2011, now Pat. No. 9,117,167, and a continuation-in-part of application No. 14/093,229, filed on Nov. 29, 2013, and a continuation-in-part of application No. 13/919,751, filed on Jun. 17, 2013, now abandoned, which is a continuation-in-part of application No. 12/798,487, filed on Apr. 5, 2010, now abandoned, which is a continuation-in-part of application No. 12/105,143, filed on Apr. 17, 2008, now Pat. No. 8,751,918, application No. 14/740,528, which is a continuation-in-part of application No. 14/286,561, filed on May 23, 2014, now abandoned, which is a continuation of application No.

(Continued)

(51) Int. Cl.
*G11B 27/10* (2006.01)
*G11B 27/34* (2006.01)
*G11B 20/00* (2006.01)
*G11B 27/32* (2006.01)

(52) U.S. Cl.
CPC ...... *G11B 27/102* (2013.01); *G11B 20/00007* (2013.01); *G11B 27/322* (2013.01); *G11B 27/34* (2013.01); *G11B 2020/00072* (2013.01)

(58) Field of Classification Search
CPC . G11B 27/34; G11B 20/00007; G11B 27/322; G11B 2020/00072; G11B 27/102
USPC ........................................................ 386/241
See application file for complete search history.

(56) References Cited

U.S. PATENT DOCUMENTS

2006/0048191 A1* 3/2006 Xiong ............... G06F 17/30799
725/52
2010/0262913 A1* 10/2010 Takagi .............. G06F 17/30017
715/723

(Continued)

OTHER PUBLICATIONS

Goranson, Ted, "A UI for Situated Reasoning about Streaming Media".

(Continued)

*Primary Examiner* — Loi H Tran
(74) *Attorney, Agent, or Firm* — Blank Rome LLP

(57) ABSTRACT

A system for creating a streaming media navigation and annotation display, allowing for deep annotation and efficient browsing of annotations. A system which additionally allows for annotating spatial elements of media, for example cinematic effects. A method which implements this using reactive methods which allow integration with advanced knowledge representation and display systems.

11 Claims, 10 Drawing Sheets

Related U.S. Application Data

12/105,143, filed on Apr. 17, 2008, now Pat. No. 8,751,918.

(60) Provisional application No. 60/912,243, filed on Apr. 17, 2007, provisional application No. 61/410,395, filed on Nov. 5, 2010, provisional application No. 61/166,579, filed on Apr. 3, 2009, provisional application No. 61/732,326, filed on Dec. 1, 2012.

(56) References Cited

U.S. PATENT DOCUMENTS

| | | | | |
|---|---|---|---|---|
| 2011/0208822 | A1* | 8/2011 | Rathod | G06F 17/30867 709/206 |
| 2013/0283301 | A1* | 10/2013 | Avedissian | H04N 21/44016 725/5 |
| 2016/0139751 | A1* | 5/2016 | Flawn | G06F 3/0483 715/230 |
| 2016/0191960 | A1* | 6/2016 | Hoeben | H04N 21/234 725/41 |

OTHER PUBLICATIONS

Apr. 16, 2014 email from program@uist.org to tedg@alum.mit.edu.
Jun. 3, 2014 email from program@uist.org to tedg@alum.mit.edu.
ACM Code of Ethics and Professional Conduct, adopted by ACM Council Oct. 16, 1992, available at http://www.acm.org/about/code-of-ethics.
Cardier, Beth, "Narrative Causal Impetus: Governance through Situational Shift in Game of Thrones".
Intelligent Narrative Technologies 7, Call for Papers, available at http://int7.westphal.drexel.edu/?page_id=8.
Jun. 12, 2014 email easychair.org to bethcardier@hotmail.com.
Jun. 17, 2014 presentation of Beth Cardier (Included on enclosed DVD).
Schedule for Intelligent Narrative Technologies 7, Jun. 17-18, 2014.

* cited by examiner

SYSTEM AND METHOD FOR SPACE-TIME ANNOTATION-CAPABLE MEDIA SCRUBBING

CROSS REFERENCE TO RELATED APPLICATIONS

This application is a continuation-in-part of U.S. patent application Ser. No. 14/093,229, filed on Nov. 29, 2013, which claims priority to provisional application No. 61/732,326 filed on Dec. 1, 2012, a continuation-in-part of U.S. patent application Ser. No. 13/919,751, filed Jun. 17, 2013, which is a continuation-in-part of U.S. patent application Ser. No. 12/798,487, filed Apr. 5, 2010, which is a continuation-in-part of U.S. patent application Ser. No. 12/105,143, filed on Apr. 17, 2008 and issued as U.S. Pat. No. 8,751,918 on Jun. 10, 2014, and is a continuation of provisional application No. 61/166,579, filed Apr. 3, 2009, U.S. patent application Ser. No. 12/105,143 being a continuation of provisional application No. 60/912,243, filed Apr. 17, 2007, a continuation-in-part of U.S. patent application Ser. No. 14/286,561, filed May 23, 2014, which is a continuation of U.S. patent application Ser. No. 12/105,143, filed on Apr. 17, 2008, issued as U.S. Pat. No. 8,751,918 on Jun. 10, 2014, which is a continuation of provisional application No. 60/912,243, filed Apr. 17, 2007, and a continuation-in-part of U.S. patent application Ser. No. 13/290,439, filed on Nov. 7, 2011, issued as U.S. Pat. No. 9,117,167 on Aug. 25, 2015, which is continuation of provisional application No. 61/410,395, filed Nov. 5, 2010, the entirety of which applications are herein incorporated by reference herein.

Embodiments described herein incorporate principles described in U.S. patent application Ser. No. 12/488,212, filed on Aug. 17, 2009, the entirety of which is herein incorporated by reference.

TECHNICAL FIELD

Embodiments described herein relate to display of streaming media, and more specifically to a system and method to perform creation and browsing of annotations, including physical, logical and cinematic situations.

BACKGROUND

A preferred way of viewing video is by digital means. Among the benefits of digital viewing is the ability to quickly move to early and late in a given video stream, for example among chapters in a theatrical movie. To support this function, a 'video scrubber' is often displayed, generally as a thin horizontal strip under the frame of the video. Moving a cursor or similar control left and right determines the location in the video being displayed, with the extreme left being the beginning of the video and the extreme right being the end.

Using such a scrubber, a viewer can easily move backward and forward in the video. Similar methods are used for any stream, for instance, scrubbing audio. The method is applied in other domains, for example in reviewing sensor steams from military sensors or those use to control factories.

In some instances, the scrubber displays additional information. For example, some displays for video streaming services will indicate on the scrubber how much of the video has been downloaded from a central store to the viewing device. The user then is advised that the scrubber will be non-functional past that point. Because a primary purpose of scrubbers in the current art is navigation, some versions will display a preview frame of the video at that location as the cursor is moved left and right.

A weakness of current methods is that a viewer cannot anticipate what is where, and actually has to move back and forth to discover any content. That is, you discover 'where you can go' using the same control that takes you there. Another weakness of current methods is that it is not possible to make indications of where one would want to go. For example, theatrical movies are broken into scenes; but a viewer may want to go to a certain scene and the scrubber should provide some easy way to locate that scene.

This weakness in current methods extends to other guiding marks that a user might want to use. For example, a user might want to make notes about some object or event on the video. These notes might be simple, for example a text note, or rich as in the case of a comprehensive illustrated essay that points to a feature in a scene or frame. And they might also want to add information overlaid on the film itself; an example might be where the camera is placed and moves in relationship to the blocking of the scene and the set. This new system and method allows all of these new features.

In the general case, whether dealing with fictional or documentary video or other streams, there is a need for a dynamic scrubber that provides information about content before and after the current location without visiting it; provides an easy way to locate and browse to added information or markers for same; and supports the creation of rich on-screen graphical annotations.

A related need concerns the display of object and human paths over time, and/or movement of the environment. This latter may involve architectural features such as walls, which can progressively move as the camera pans, but can also address off-screen items such as the camera and light sources, the position of which might also need to be tracked. If these needs were addressed adequately, a vocabulary of cinematic effects can be modeled, annotated and browsed. This new system and method enables this.

An unrelated need concerns dynamic update. In the example of annotated theatrical films, the film itself is an unchanging artifact. But the annotations may be dynamically changing as collaborators add items and intelligent or human composition systems change the result. A more general case is that the base streaming file is dynamic, either because it is being modified, or because it is a continuous stream. Therefore, there is an additional need for a scrubber that indexes and allows browsing of both streaming media and annotations of various kinds that is also dynamically updatable.

In the current art, there is no computing system that can scan a video, collection of videos or other streams and extract features that can be used for advanced spatio-temporal navigation. Similarly, there is no computing system that manages dynamic ontologically-registered knowledge of a film to support advanced spatio-temporal navigation. There is, in the current art, no computing system that can combine the two and generate a display to be delivered for example over the internet to a browser to support advanced spatio-temporal navigation.

Therefore, there is a need for a computing system that can be modularized into components, one of which processes video streams to identify features for knowledge anchoring. A second cooperating computing system is needed to manage collected, consolidated information relevant to the video and deliver it in a fashion optimized for linking to the anchors determined by the first system. There is a need in the art for a third computing system to assemble the results of these two systems and deliver a navigable visual presentation to a consuming client computing system, for example a computing system that supports a web browser.

DETAILED DESCRIPTION

Figure 1:
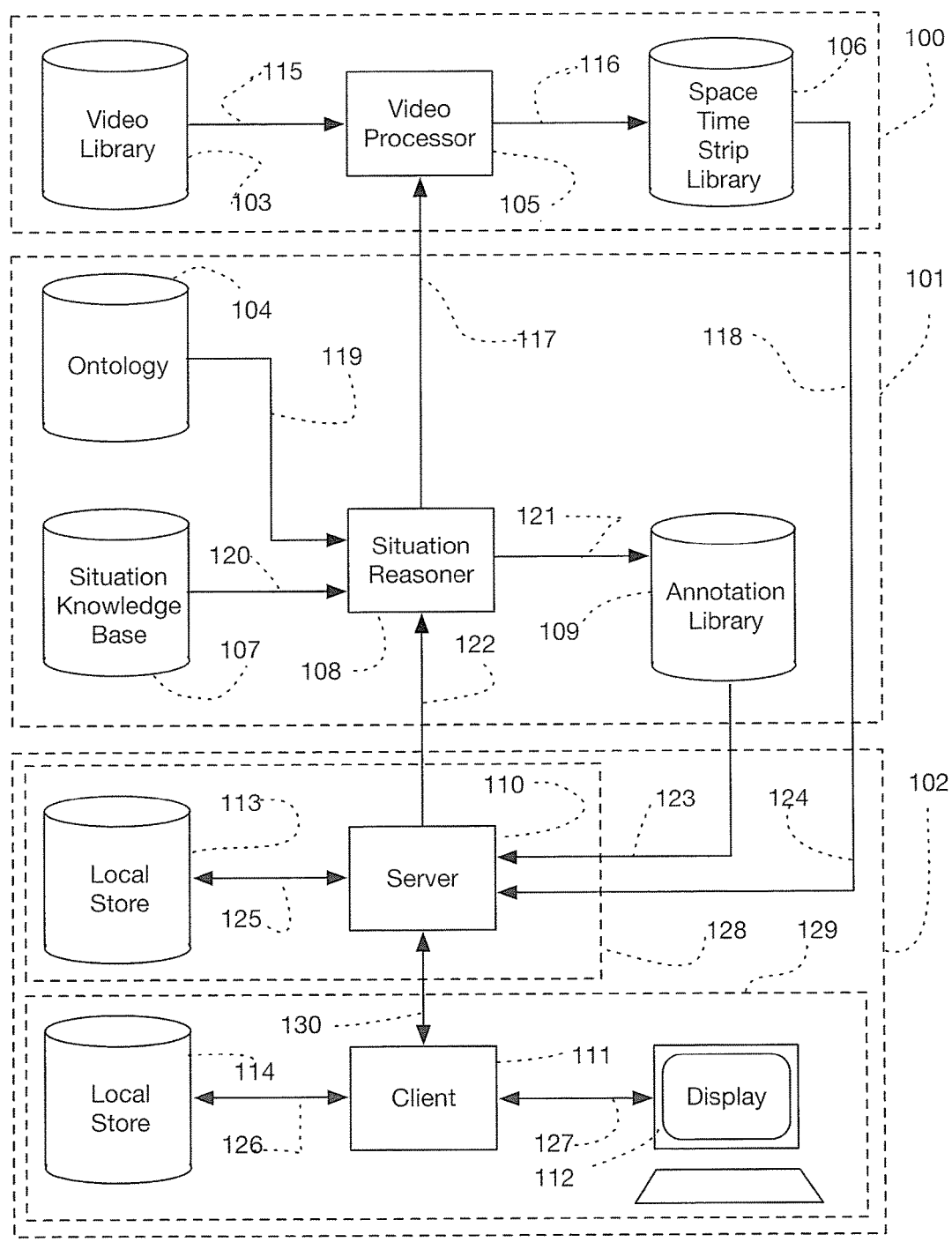
FIG. 1 illustrates a system according to embodiments described herein.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made.

Embodiments described herein include a computer system. The computer system may be any computer system, for example, a smartphone, a tablet, a personal computer, a minicomputer, or a mainframe computer. The computer system will typically include a processor, a display, at least one input device and random access memory (RAM), but may include more or fewer of these components. The processor can be directly connected to the display, or remotely over communication lines such as cable, telephone lines or local area networks. Embodiments may include both commercial off-the-shelf (COTS) configurations, and special purpose systems designed to work with the embodiments disclosed herein, so long as the hardware used is capable of performing the tasks required by specific embodiments.

These systems may present themselves as video viewers, for example a computer or tablet screen, but also as a television or movie screen.

FIG. 1 illustrates an embodiment of the system as might be used by a web service to support collaborative annotation. This system may be implemented in a consolidated computing platform that supports all the functions. For this example, we use three systems to illustrate the modularity.

System 100 in this embodiment is a discrete computing system consisting of a processer 105 that performs in part the function described herein as video processing. System 100 includes two data stores 103, 106. One data store 103 is fed from streaming sources and contains the raw video that will be processed by 105. A second data store 106 receives the processed video according to the steps illustrated in FIG. 2. Not illustrated are components required for general operation of the system.

System 101 is also a discrete computing system, in this embodiment similar to system 100. It contains three data stores to support the relevant steps illustrated in FIG. 2. Data store 104 contains reference ontology information, for example of the kind specified by the OWL2 standard. Data store 107 contains knowledge structured as specified by the ontology or ontologies in 104 and structured using situation reasoner 108, that supports this and other processing steps. Data store 109 contains the processed result according to the steps described in FIG. 2 and appropriate for delivery to system 102.

System 102 is a client server system consisting in this embodiment of two discrete systems. The server system 128 and the client system 129. In a typical embodiment, systems 100, 101, 128 and 129 will be discrete computing systems. A common implementation will have systems 100, 101 and 128 networked via a local area network. System 101 communicates with System 100 via network connection 117. Systems 100 and 101 communicate with client system 128 via network connections 118 and 123 respectively. System 128 further communicates with system 101 via local network connection 122.

In the described embodiment, the server system 128 is networked to the client system 129 by the interne via the connection 130. Components that enable network connections 117, 118, 122, 123 and 130 are not shown.

One system 100 is a video processing and recognition system that in part processes the video into artifacts that are the visual representation of the entire film. This system 100 supports input from a second system 101 which advises on features of interest, allowing the video processing and recognition system to identify where they occur and to place appropriate location tags.

A second system is a knowledge management system 101 that manages the knowledge base of elements associated with the film, and which are displayable on a space-time representation of the film. These may be human-maintained annotations, elements from external and deduced sources or elements automatically identified from the video processing system.

A third system is a user presentation system 102 that combines the space-time view from the video processing system 100, with annotations and associated media from the knowledge management system 101 for interactive display by a viewer.

Figure 2:
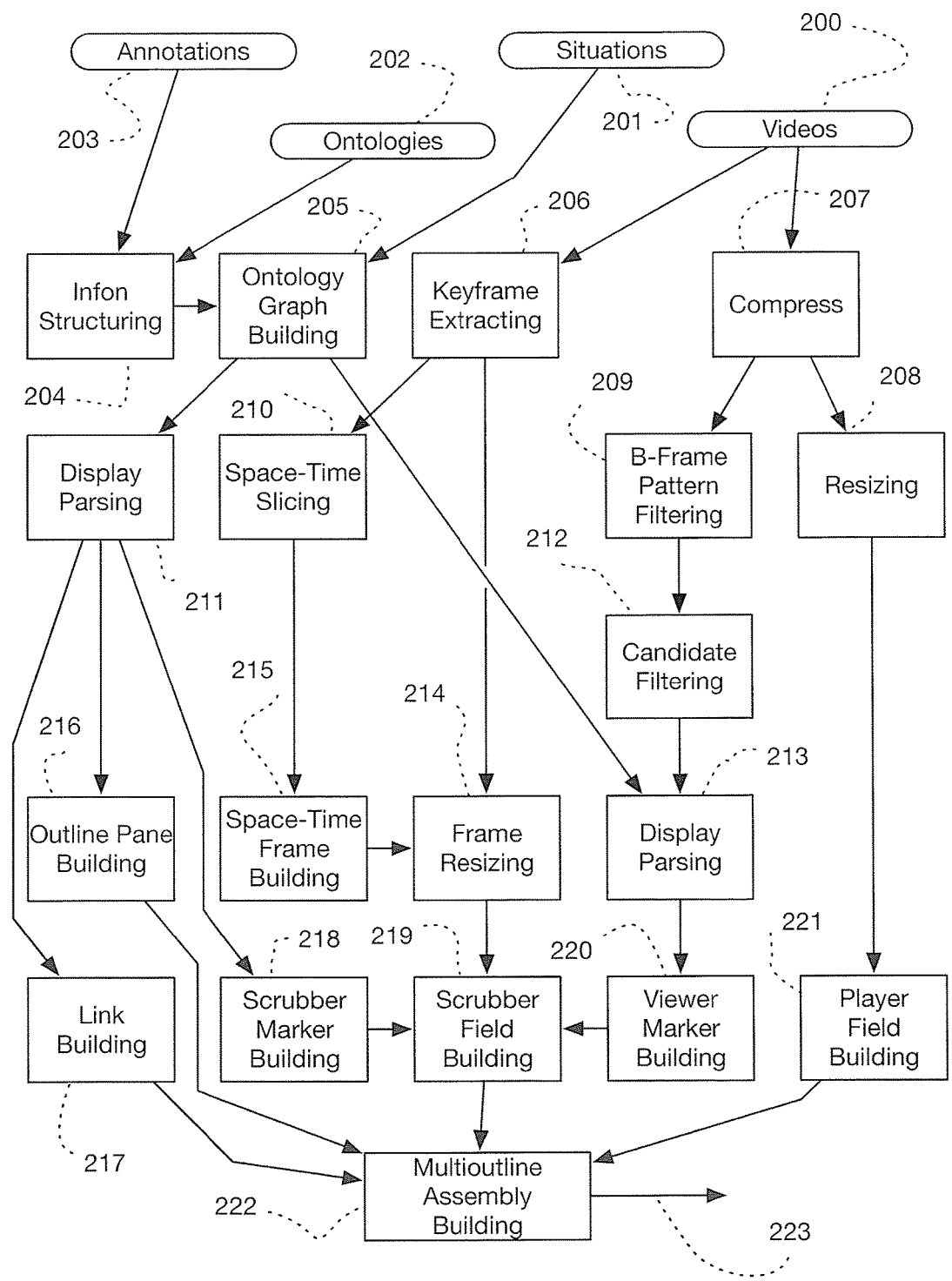
FIG. 2 shows an embodiment of the tasks performed by the system of FIG. 1.

FIG. 2 illustrates the steps performed by these three systems in flow chart form. In the discussion that follows, steps from FIG. 2 will be supported by computing system elements of FIG. 1. The illustrated system of FIG. 1 and the steps of FIG. 2 are in support of fixed length videos that deliver narrative content, such as theatrical movies, but any continuous data type can be similarly addressed.

The video processing system can be a simple system as illustrated in FIGS. 1 and 2, or a more advanced system as described in U.S. patent application Ser. No. 13/290,439, filed on Nov. 7, 2011, incorporated by reference herein, which supports collaborative processing of many films. Such an advanced system would allow the B-frames described below to be generated across many source videos.

The video processing system 100 accepts a video 115 as a digital stream, compressed or not. Videos can come from a video library 103 associated with the video processor or by other transfer methods.

Such a profile looks at each frame of the video and compares to a set number of frames before and after to identify common patterns. If such a pattern is found, it is captured mathematically as a B-frame, together with the mathematical formulas to transform that pattern from previous frames and to future frames. This technique, called 'advanced video coding,' can result in substantial compression improvement over the technique of compressing each frame as if it were a photograph. Such compression may be accomplished at processor 105 by software, special hardware or some combination.

Parameters for this B-frame compression are set external to the process, and usually are specified to result in an optimum balance among cost of decoding, file size and perceived image clarity. In our example, these parameters are specified for a different task, which is to identify regions that may indicate people or objects. These B-frame objects are used later in helping to outline and mark objects to be annotated.

The processor 105 of system 100 performs several steps. As noted, it compresses the video at step 207 (if it is not already suitably compressed), then the result is resized at step 208 if necessary and prepared for delivery at step 221 as a streaming video for embedding in the presentation to the user.

A second process supported by the video processor 105 of is the extraction of key frames (step 206) that are resized at step 214 and combined at step 219 to form a component of the display, using a method described in detail below.

Yet a third process performed by the video processor 105 of is the slicing of key frames 210 into vertical slices according to the method described below. These are composed into frame assemblies at step 215, further processed to match key frame parameters (like aspect ratio) at step 214, assembled with other components at step 219 for presentation.

Yet another process supported by the video processing system 100 is the linking of objects and annotative features to the video artifact. This begins with the determination at step 208 of appropriate B-frame patterns for compression. At step 209, these frames are identified as features of interest for use in linking to objects that may be selected by the user at client workstation 112. An example of this is a B-frame that detects edges of a car in a sequence of frames. Suppose a user at client workstation 112 wants to select that car for outlining and emphasis in the display (as described below). The already established edges (explicitly identified as edges) can assist in this process.

These edges are processed through a feature identification process, step 212 to pretag objects, motions and cinematic elements of interest. Cinematic elements may include camera movement, lighting, framing, blocking and editing qualities.

The resulting candidates will have been the best that can be identified automatically. Step 213 takes these automatically generated features and matches them with items from the knowledge base 205 that is described below. The effect is that semantically rich annotative material is bound to visual material at step 213 and processed with user affordances at step 220 for presentation.

A second hardware system, the knowledge management system 101 is responsible for the storage of annotative information. This information informs two operations. The primary function is to manage rich annotations and associated material that is delivered in an optimized form for delivery to a user. It will be displayed concurrently with the image display produced by video processing system 100 to present structured semantic and video information.

System 101 also informs the video processing system 100, via network link 117. Network link 117 conveys information that connects data structured at step 205 with anchors in the synthesized output of video processing system 100 at step 213.

The knowledge management system 101 structures information that is known about the videos in the library 103 which later is bound to features identified by system 100 and prepared for display by system 128 by the means described below.

The hardware system 101 described here is a single computing system, but the functions can be managed in a distributed fashion using technology similar to that described in U.S. patent application Ser. No. 13/919,751, filed Jun. 17, 2013, and incorporated by reference herein. Alternatively, an advanced hardware system can be used to perform in depth narrative interpretation, as described in U.S. patent application Ser. No. 14/093,229, filed on Nov. 29, 2013, and incorporated by reference herein.

This knowledge management system 101 minimally consists of a processing unit 108, a store for ontological information 104, a store of the structured knowledge 107 pertinent to the use and a store, noted as the annotation library 109 for the annotations optimized for delivery and display. In the illustrated case, the users are creating, browsing and sharing structured information about feature films, such information being associated and displayed with elements of the film as synthesized by the system.

The results of the process are stored in a form in annotation library 109 optimized for delivery and display.

A simple example of the information stored may be a set of choreographed moves of characters fighting within a film. This might involve a combination of data, text analysis, some images with and without annotation and video clips in addition to the anchor in the focus video.

Ontologies 202 are stored in the ontology library 104. Annotations and situation information are stored in the situation knowledge base 107.

The knowledge management system 101 performs two functions.

Annotations 203 are elements in a structured knowledge base 107. The structure is created in situation reasoned processing unit 108, with reference to the ontologies 202 stored in ontological information store 104. Multiple ontologies 202 can be used.

The annotations 203 stored in 107 may have been collected by means not covered here, and/or provided by users via connection 122 to the processing unit 108, structured and stored in ontological information store 104. In the described implementation, the knowledge is structured into standard form at step 204, here shown as infons known in the art of situation theory.

These are then assembled into knowledge structures at step 205 suitable for the purpose. In the illustrated embodiment, ontology graphs are used. The process steps 204 and 205 are executed on the situation reasoned processing unit 108.

The result of step 205 is stored in annotation library 109 is made available to a third system for two processes.

The knowledge management system 101 can be simple, as illustrated here, or substantially more powerful as described in U.S. patent application Ser. No. 14/093,229, filed on Nov. 29, 2013, being able to add new information and linkages via artificial intelligence.

The third system, the user presentation system 102 in this embodiment illustrates a client-server architecture. A more distributed architecture is possible, combining server processor 110 and client processor 111. A distributed system is also possible. The only requirement is to receive information from the other two systems and merge them for display to one or more users at client workstation 112.

The illustrated user presentation system 102, consists of a server 110 with local storage 113, a client 111 with local storage 114 and a user interface component, illustrated as a display at client workstation 112. The client system 111 and display at client workstation 112 can be any computing device capable of receiving and displaying the information.

One process sequence supported by the user presentation system 102 is the relating of features identified by the video processing system 100 to structured annotations from the knowledge management system 101. The goal is to link knowledge to the relevant display.

Structured knowledge from 205 is delivered to the process 213, which also receives features identified from the video from 212. The knowledge is linked to the visual affordance. For example, the information from 212 may be edges of an actor on screen. The information from 205 might be structured knowledge about who the character is and what he is doing at that moment.

Process 213 performs the match between the knowledge elements built at 205 and stored in annotation library 109 and the image features identified at 213 and stored in 106. The result is supplied to a process 220 that generates a displayable format that is composed with others in 222 and delivered to the user 223.

A parallel process supported by the user presentation system 102 is the building of structured displays from structured information. This starts with the structured information created at 205 and stored in annotation library 109. Information is supplied to 211 which processes the information to produce three information products. One of these are supplied to 217 to create navigational links that in turn are supplied to 222 to build the display that in turn is supplied to the user 223 via the client 111.

Another parallel process has information generated by 205 and stored in annotation library 109 supplied to process 211 which linearizes the graphs generated by 205 into page-compatible format at 216. In a fashion similar to the process chain described above, this information is supplied to the composition process 222.

Yet another parallel process also processes information from process 205 and stored in annotation library 109, also parsed in process 211 and this time producing information required to place annotations on the space-time strip, further processed at step 218 to create the image artifact supplied to steps 219 and 222 for delivery to a user at step 223.

These processes 211, 213, 214, 215, 216, 217, 218, 219, 220, 221 and 222 are supported by the server 110.

The display system constructed by system 128 and presented on the display 112 of system 129 may be rudimentary as illustrated in the following figures, or more complex as described in U.S. patent application Ser. No. 12/105,143, filed on Apr. 17, 2008, issued as U.S. Pat. No. 8,751,918 on Jun. 10, 2014, and incorporated by reference herein.

The types of information that exist in system 101 are: situations 201 (stored in 107), ontologies 202 (stored in 104) and annotations 203 (stored in 109). Annotations 203 are collectively the information that is displayed to enrich the video. Annotations are typically multimedia information, but any kind of data can be displayed in any way that has value. The display of annotations will typically be in a field adjacent to the scrubber. Therefore, a novelty of embodiments of the system is that typed links can be visually displayed, e.g., on display 112, from the element(s) being annotated and some display of the annotation.

Ontologies 202 and situations 201 are generally information managed internally, though an accompanying annotation system may choose to display them as useful information in addition to the annotations. Ontologies 202 are formal descriptions in a logical form of the semantics of the system. A novelty of embodiments of the system is that it can deal with multiple ontologies, including but not limited to ontologies specific to cinematic and visual qualities. Every piece of information in the system has the capability to be handled as a fact that is registered within the context of a formal ontology. This includes all the objects displayed in the scrubber, including frames, scenes and selections.

A generally unfamiliar information type are situations 201. A novelty of embodiments of the system is that it can recognize and display the results of a reasoning system that utilizes situation theory. Situation theory was initially developed by Barwise and Perry and expanded by Keith Devlin and Barwise. It is a formal system, with underlying mathematics to support the way situations influence the meaning of facts and their presence in inferences. It is powerful and capable of subtle reasoning, like reasoning that occurs at an emotional level when experiencing a film.

A standard reference for situation theory is: John Barwise and Jon Perry, 'Situations and Attitudes,' MIT Press, 1983.

Situation theory was extended and clarified in Keith Devlin, 'Logic and Information,' Cambridge University Press, 1995.

Situation theory in the context of category theory was explored in Jon Barwise and Jerry Seligman, 'Information Flow,' Cambridge University Press, 2008.

The first practical implementation of situation theory, leveraging the work of Barwise and Devlin is described in H T Goranson and Beth Cardier 'A Two-Sorted Logic for Structurally Modeling Systems,' Progress in Biophysics and Molecular Biology, volume 113, issue 1, 2013, pages 141-178.

Several main components are integrated into the final display of the scrubber. These are: the actual display of images synthesized from the film, managed by step 219; the film in its original form for playing if required, managed by step 221; links of a powerful kind from annotations, managed by step 217; semantics associated with the film (rather than the annotations), managed by step 220; and anchors for the links, managed by step 218.

The calculation of these five items are now described, tracing the relevant flow through FIG. 2.

The film, for playing in the interface is managed through step 207 which digitizes it. Compression is not a factor in this chain, so long as it is not too lossy. The result is resized at 208 to fit the frame designed for display. Then the function at step 221 adds anchors mirrored from those computed for the scrubber so that if a user wants to jump from the scrubber to the actual film, it is possible. Some other minor registration processes occur at step 221.

B-frames are prepared for the viewer's use as pre-identified objects or interest, including people. The process starts at the source video 200. It is compressed at step 207; in this flow, the specification of the B-frames and the resulting mathematical objects are significant. Step 209 performs some object recognition, perhaps based on ordinary expert methods, or an advanced method. The example described here presumes something like the system described in U.S. patent application Ser. No. 13/290,439, filed on Nov. 17, 2011, and incorporated by referenced herein. The function of step 209 is to associate the raw mathematical description of the B-frame to speculative identification of objects.

Many of these objects will not be useful. Step 212 narrows the historically very large set of objects to those that may be useful. Because everything in the system is situated and potentially reactive, the filtering profile is changeable.

That is, objects not of interest in one annotative setting may be of interest in another. An example is whether the annotators are interested in environmental surfaces (like walls) and features (like windows). Others may be interested only in characters regardless of position.

Step 213 sorts the objects based on the entities defined in the ontology as managed by step 205. Step 220 then does the edge tracing, color and contract adjustments (and other visual cues) that would be displayed should the object be called in an annotative context.

A more complex flow is that associated with link anchors and links. Typed links are the primary means of relating entities in the system. (The scrubber can also be used in ordinary applications where the power of typed links is not leveraged.) In this case, the scrubber must support both the mathematics of such links and the mathematics of link anchors that are displayed on the scrubber. This flow starts with three primary sources. Annotations as they exist are served by information stores managed by step 203. Ontologies that define elements in the annotations and explicitly on the screen are served by stores managed by step 202.

The facts of the annotations as managed at step 203 are interpreted by conventional means by the structures and entities of the ontologies managed by the process of step 202. Together, these are used to structure facts in the system in the normal form required to support situation theoretic reasoning. These fact structures are called 'infons' in the art and are defined in some detail in Keith Devlin, 'Logic and Information,' Cambridge University Press, 1995. This infon structuring process is handled at step 204.

Situations managed at step 201, take these infons from 204 and 'situate' them. A process that described the mathematics and logic of such a system is described in H T Goranson and Beth Cardier 'A Two-Sorted Logic for Structurally Modeling Systems,' Progress in Biophysics and Molecular Biology, volume 113, issue 1, 2013, pages 141-178. But any suitable situated reasoning system can be employed. The result from the process of step 205 are 'ontology graphs.'

Ontology graphs are simply adjusted ontologies, having two characteristics: they are limited to the ontological entities that bear directly on interpretation, and the structure among those entities is adjusted according to the governing situation. A system capable of doing this is described in U.S. patent application Ser. No. 14/093,229, filed on Nov. 29, 2013, and incorporated by reference herein.

Situated ontology graphs are used to determine what links and anchors that are relevant to the situation can be displayed. Such items might not be displayed in various conditions. Examples are: the section of the film that the link anchors to may be scrolled off the screen. Similarly, an object at either end may be not displayed (for example in the case where an element of one film links to another film not yet displayed); or the user may filter the class of links or anchors for visibility or clarity, or do so one at a time. This is handled at step 211.

Information about what is structured and among that information, what is displayed is conveyed to the annotation display service via step 216. The display served at step 216 may be handled by a more robust user interface component running in parallel. Such a component is described in U.S. patent application Ser. No. 12/105,143, filed Apr. 17, 2008, issued as U.S. Pat. No. 8,751,918 on Jun. 10, 2014, and incorporated by reference herein, but any parallel component or none may be used. Should a parallel component be used, it can support enhanced versions of the processes at steps 201, 202, 203, 204 and 205.

The result of step 211 is also conveyed to steps 217 and 218 which manage the scrubber handing of links and their anchors respectively.

A novel feature of embodiments of the scrubber is that it computes and displays a synthesized view of the movie. This chain of processes starts with the video of course, as served by 200. More detail on the extraction and handling of space-time frames is described in following figures. Process 206 extracts frames from the video. In an example described below, these are every second, but could be any frequency.

Process 210 takes the frames from step 206 and creates vertical adjacent slices of equal width from a frame. In an example described, these are 2 pixels wide when displayed in the scrubber, but any width can be used. For reasons that will become clear, these are called space-time slices. Process 215 assembles slices into synthesized frames that are resized at step 214 and integrated into the display at step 219.

There is no hard requirement for step 206 to precede step 214, nor for the keyframes to be extracted from raw video from 200 instead of compressed video from step 207 or step 208.

All of the elements of FIG. 2 are designed in a fashion that they can be implemented reactively, for example by functional reactive programming. Reactive programming maintains persistent connection among the elements of a system so that if something changes in a previous calculation, the change can immediately ripple through the system. An example is if a situation changes. This can occur whenever the viewer changes, such as the case of the intelligence analysis of video footage, since very viewer brings his/her own context to the film, and experiences it differently. Another example is when a new fact is added as an annotation which changes or modifies a deduction or interpretation of the film. Yet another example concerns dynamic ontologies.

Another example is when the streaming source changes. In the described example, this will not happen, theatrical films generally being unchanging artifacts. But the system is designed to manage and display annotations of any streaming media type. Many of these are sensor streams that are live or apparently so and constantly providing new calibration on the domain of interest. As this source changes, or governing situations change, semantics may have to be adjusted all through the reasoning chain.

A crude, non-semantic example is the chain of steps 200, 207, 208, 221 which presents a version of the original film for display. Suppose a version of the interface allowed a user to resize the frame in which the video is played. The resizing at step 208 may reactively change.

Figure 3:
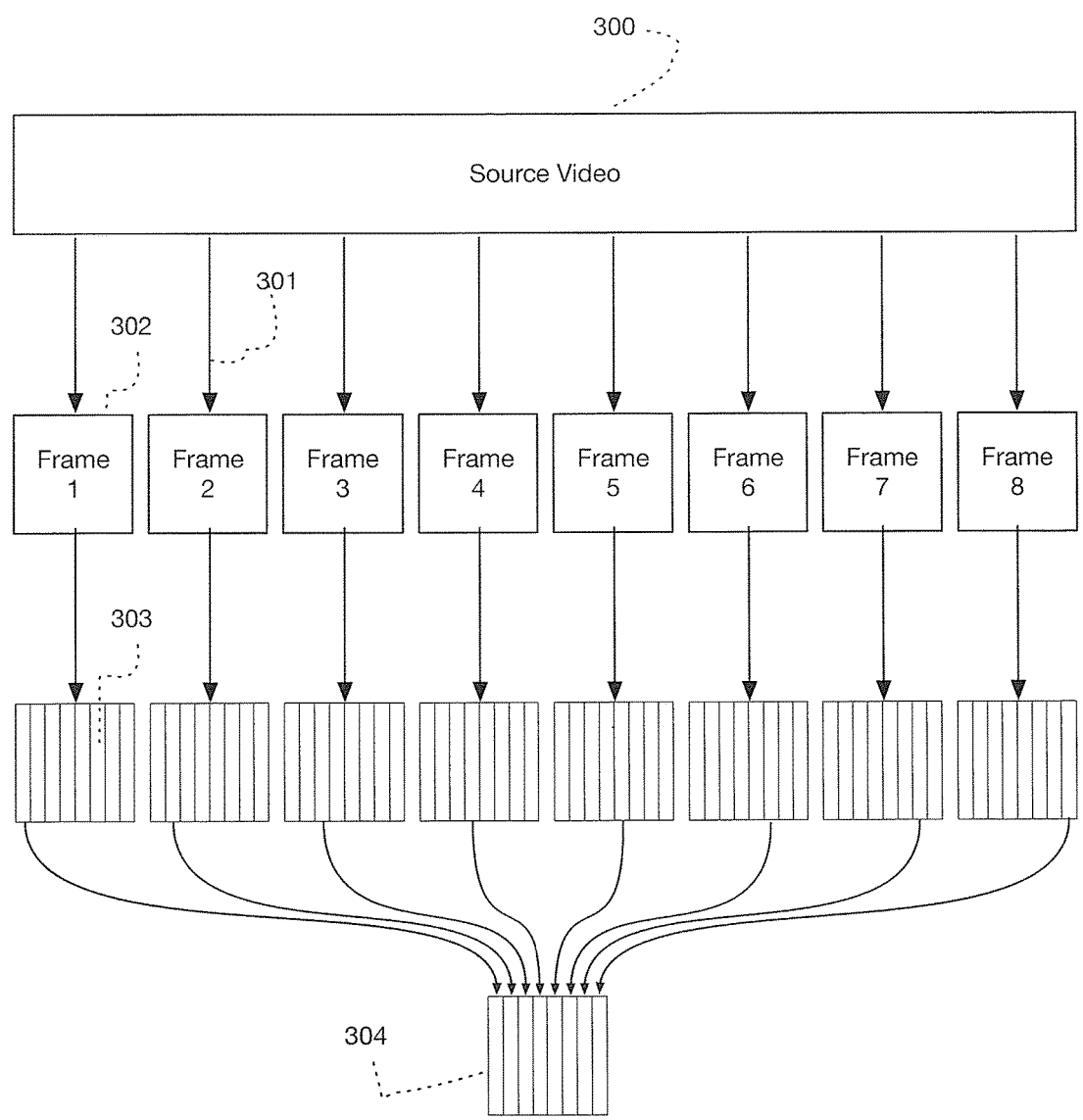
FIG. 3 illustrates an embodiment of a space-time frame.

FIG. 3 shows the process of extracting keyframes as at step 206 and space-time slices at step 210 and assembling them into space-time frames at step 215.

The video 300 presents itself as a stream. Internally it is divided into frames, typically 24 or 30 frames a second. Process 206 of FIG. 2 selects keyframes 301 from among these. In the described example, the keyframes 301 are from every second. It is important that whatever frequency is selected that the period be constant between any two adjacent keyframes. Eight keyframes are shown in the figure, but as many as required will be extracted.

Process 210 of FIG. 2 slices each keyframe into adjacent vertical slices 303. The example will specify 2 pixels wide when displayed in the scrubber. Any number is acceptable, but again, the regularity of thickness must be preserved.

Space-time frames 304 are constructed of these slices according to the following: the first slice 303 of the first keyframe 302 becomes the first slice of the space-time frame 304. The second slice of the second frame becomes the second slice of the space-time frame. The figure shows eight slices with the eighth slice of the eighth keyframe becoming the eighth slice of the space-time frame. This constructs the first space-time frame.

The second space-time frame of the film is constructed by taking the first slice of the ninth keyframe to be the first slice of the second space-time frame. The second slice of the second space-time frame is supplied by the second slice of the tenth keyframe. The process continues thus until all keyframes have supplied a slice.

The steps illustrated in FIG. 3 are as described in U.S. patent application Ser. No. 12/488,212, filed Jun. 19, 2009, and incorporated by reference herein. That filing covers a static creation of one set of space-time frames. The system described here uses dynamic display to move among many sets of similarly constructed space-time frames. Details are described below.

Figure 4:
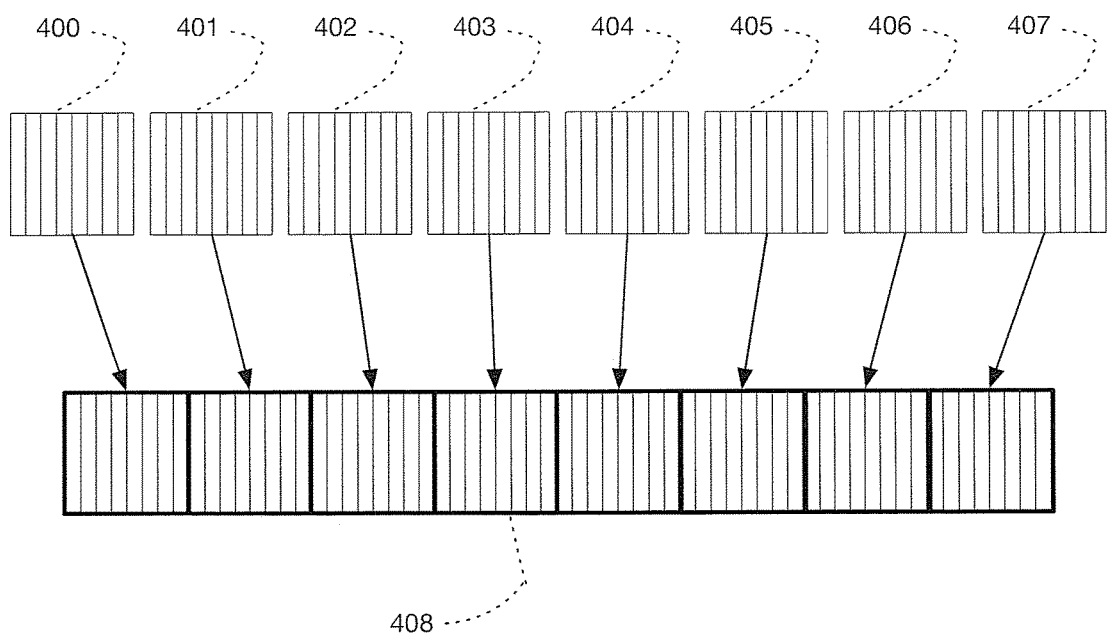
FIG. 4 illustrates an embodiment of a space-time strip.

FIG. 4 illustrates the composition of space-time frames into a space-time strip. The process is a matter of simple concatenation. Space-time frames are arranged so that the first space-time frame 400 is placed first in a displayed space-time strip 408. To the right of this is placed the second space-time frame, the one whose left-most space-time slice is the first slice of the ninth keyframe from the example above.

The third 402 forth 403 and fifth 404 space-time frames are added until all the derived space-time frames are assembled. The space-time strip adds delimiters, drawn here as bold outlines, to discriminate one space-time frame from another.

The result is a structure that has some desirable properties:

- The length of the space-time strip maps to the length of the movie, but is much shorter in the display than a concatenation of frames or keyframes would be. The relative shortening depends on the selected frequency of the keyframes and thickness of space-time slices. This relative shortening makes it possible to have a preview-centric scrubber not be so long it is a burden to the user when used on a screen.
- All the space-time slices are arranged in order of time. Using our example settings, each two-pixel wide space-time slice maps to a time location in the film, one second apart. Therefore, each space-time slice can be a screen control, used to select a position in the film based on the origin of the space-time slice. For example, in the discussion above, the second slice of the second space-time frame would map to the tenth keyframe and could be used to display that location of the film in a display pane. This is why 'time' is included in the name.
- Each of the displayed space-time frames is the same aspect ratio as the film. As a result, every displayed pixel in the space-time slices are in the same physical location in the space-time frame that it is in the film itself (and the keyframe). Said another way, the spatial organization of the display is preserved. This is why 'space' is included in the name.

Figure 5A:
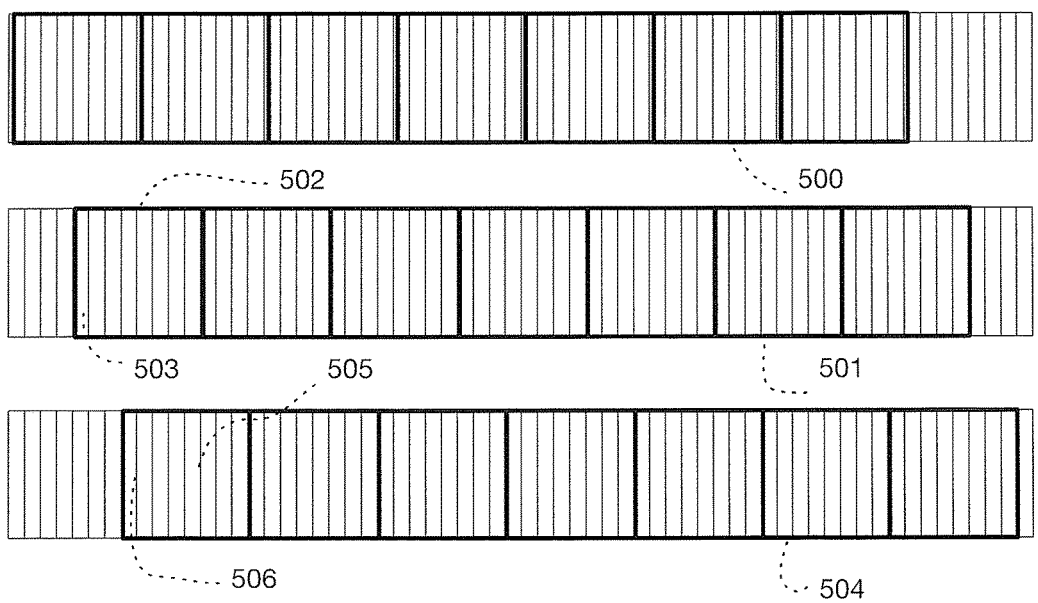
FIGS. 5a, 5b and 5c illustrate an embodiment with dynamic slice display.

FIG. 5a illustrates dynamic slice display. FIGS. 3 and 4 show how to build one space-time strip, beginning with the first slice of the first keyframe. It is possible to build a space-time strip starting with a space-time frame built with the first slice of the space-time frame coming from the second slice of the first keyframe. The construction proceeds as before, but with the space-time slices all being the one from the right.

In this construction, the bounding box of the space-time frame also moves to the right so that spatial registration of pixels within the frame is maintained.

Space-time strip 500 is constructed as described in FIG. 4. Space-time strip 501 is an example of a strip built with the same method but a different starting slice. Space-time frame 502 has as its first space-time slice 503 the first space-time slice from the fifth space-time keyframe. Accordingly, the space-time frame bounding box of 502 has shifted to the right a distance of five space-time frames. This is to preserve the spatial registration of always having the location of the slice in the keyframe and the space-time frame match.

That is, the eighth space-time slice in any space-time frame is always from the eighth space-time slice of some keyframe. The feature illustrated in this figure requires that all such possible space-time strips are constructed. In other words, if a typical keyframe is divided into x space-time slices, then there are x space-time frames that will have been constructed.

Space-time frame 504 is another example. In this case, space-time frame 505 is registered seven space-time slices to the right, further on in the film. Space-time slice 506 is from the eighth keyframe. If that keyframe were supplying a slice to space-time strip 500, it would be the eighth slice of that keyframe. But for space-time strip 504, space-time slice 506 is the first space-time slice of the eighth keyframe.

The left over space-time slices at the beginning and end of space-time strips may be ignored, as generally the first and last few seconds of a film are not interesting. Alternatively, they can be filled out with blank or neutrally colored slices to form complete space-time frames.

Figure 5B:
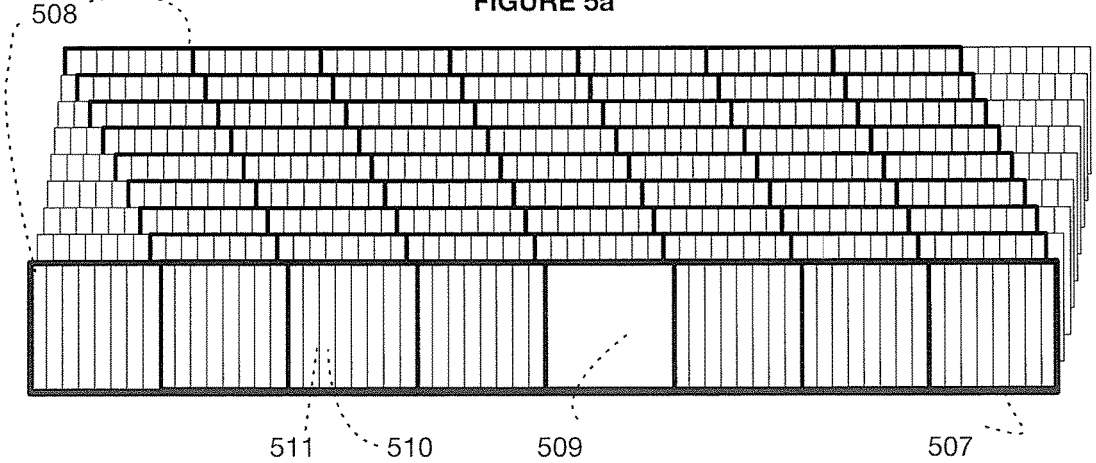

FIG. 5b illustrates a dynamic space-time strip viewer. Eight space-time strips 508 are indicated in the drawing behind the frontmost. The actual number would be the number of space-time slices that comprise each keyframe. The illustration schematically shows a space-time strip viewer 507.

If the user is not moving his/her cursor, the view is of a single space-time strip. Each keyframe will have a single space-time slice displayed. They are collected and assembled into space-time frames such that the spatial location of pixels within the frame is preserved between keyframe and space-time frame.

If the user moves his/her cursor left or right, the selected space-time slices change, as do the time-space frame delimiters. In one implementation, the user action would include the ability to grab somewhere within the space-time strip and move back and forth. In another implementation, the user would move a selection cursor left and right. In either case, the effect would be the same.

In this example case, a preview pane can be used to display the full key-frame. It can be and often is separate from the scrubber with a display area larger than that of a space-time frame. Alternatively or in addition, it can be integrated into the scrubber. Two ways are popular. One is that the scrubber is divided in half and the preview pane inserted in the middle. Another, as shown in FIG. 5b, has the preview pane 509 sitting above the scrubber's space-time strip 507, precisely over the central space-time frame.

In the case where the selection 510 moves left one space-time slice 511, the following occurs:

- The displayed preview in the focus frame is changed to display the keyframe; with our example settings, that would be the keyframe one second earlier in the film.
- Every space-time slice in the entire visible space-time strip changes to be the space-time slice from the same keyframe but the one to the left.

Every space-time frame boundary moves one space-time slice unit to the left, so that the spatial integrity of every pixel is preferred.

In this way, if the user moves the cursor or space-time strip the full width of a space-time slice (the same as the width of the keyframe), then every pixel of every keyframe will be shown in that time for every space-time frame bounding box that is visible on the screen.

Figure 5C:
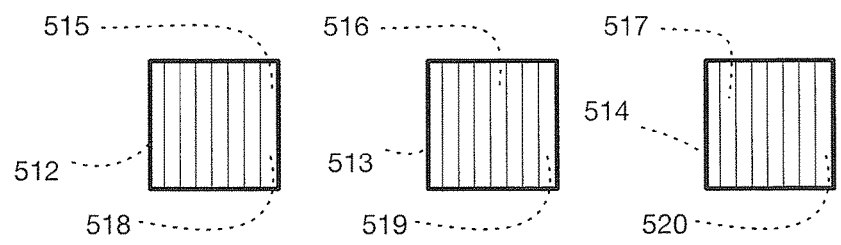

FIG. 5c illustrates this dynamic space-time slice reassignment by showing three stages of a single space-time frame as a user moves the selection by some means. An important point is that all displayed space-time frames modify at the same time and in the same regardless of whether they are the area being navigated upon.

Space-time frame 512 is the state at rest; 513 is the state when the selected space-time slice somewhere in the scrubber has moved right three space-time slices. 514 is the state when the selected space-time slice somewhere in the scrubber has moved right three additional space-time slices.

Every space-time slice changes between 512 and 513, and again between 513 and 514. The same key frame contributes space-time slices to 515, 516 and 517, but they will be different slices. For state 512, the slice will be the eighth slice from that keyframe, and be placed as the eighth slice in the space-time frame. For state 513, the slice will be the fifth slice from that keyframe, and be placed as the fifth slice in the space-time frame. For state 514, the slice will be the second slice from that keyframe, and be placed as the second slice in the space-time frame.

As the navigation moves from state 512 to 514, this space-time frame will have displayed roughly ¾ of the contents of that keyframe. This will be true of all eight keyframes represented in the space-time frame. Because scenes are typically continuous over some period of time, a viewer can in this way 'see' enough to quickly locate any scene, object, character or annotation marker as described below.

The system, therefore, compresses the entire film by means of keyframe selection and partial space-time slice display. But it reveals the content of the entire film in an effective way in a compressed space, making navigation and situational reasoning easier than alternative solutions.

An implementation of this system may choose to keep the space-time frame boundary stationary, or keep the location of each keyframe's contributed space-time slice stationary.

Figure 6A:
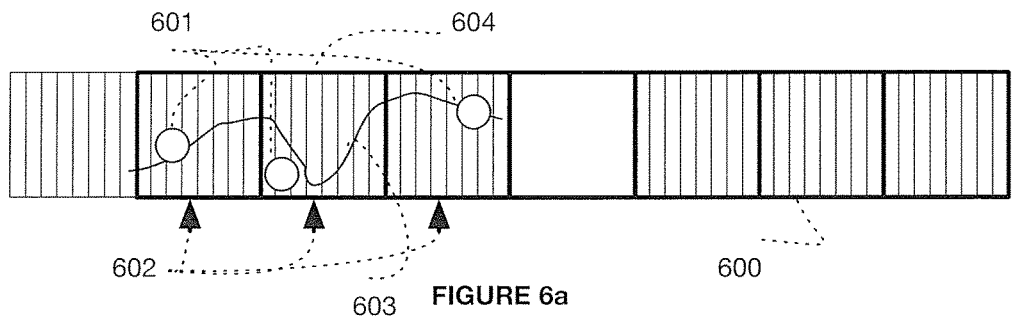
FIGS. 6a, 6b and 6c illustrate an embodiment with overlaid object and environment paths.

FIG. 6 illustrates how the periodic space-time frames in a strip can be used to show animated element paths and animated environments. FIG. 6a shows a region of a space-time strip, a region displayed in an interface. This is the same strip as shown in FIG. 5b. Imposed on the space-time strip is the path of a key object. The object is drawn here as a circle for graphical clarity. An implementation could readily show the actual outline of the object.

It should also be noted that there is no constraint that forbids display outside of the boundaries of the space-time frame. FIG. 6 shows objects whose track remains in the frame at all times, but implementations can be built that follow objects or architectural elements as they (or parts of them) move in and out of the frame. This is especially helpful when annotating implied objects and architectural features.

FIG. 6a shows a representative space-time strip 600, similar to 507 of FIG. 5. It has a display of a certain object of interest 601. This object 601 appears in three space-time frames because they cover the time period that the object appears on screen.

By some means as described above, a user has selected a location to preview. This means that concurrently, all visible space-time frames have the space-time slice at that same location selected. For example, in FIG. 6a a user has elected to view a keyframe that is at the fourth space-time slice in the space-time frame he/she has as the focus. FIG. 6a shows by arrows 602 that the fourth space-time slice in every space-time frame is selected within that frame. For user feedback, there may be some indication of that selection; perhaps an arrow like 602, of some highlighting.

Object 601 is displayed in each space-time frame at the location the object occupies in the keyframe corresponding to the space-time slice that is indicated within the space-time frame. As the user moves the cursor right and left, the object moves within each space-time frame just as it does in the film. Recall that the discussion of FIG. 5 indicates that the enclosing boundary of the space-time frame moves right or left as well.

In this way, if the user has selected or filtered the view by some means to display an object or objects, that object can be viewed as it moves in the preview frame and also in every visible space-time frame where it appears.

FIG. 6a also shows a path, 603. This is the path that the object takes across all of the keyframes associated with the space-time frame. So there are two related object displays here. The object's location in two dimensions 601 within the space-time frame as is in the indicated keyframe, and the object's location on one dimension (height) on every space-time slice indicating the height on the corresponding keyframe.

That means that the object display 601 will not normally be on the vertical object graph 603, because of the addition of horizontal position of 601. Space-time frame 604 shows this phenomenon; the object is in the left hand corner of space-time frame 604, occupying the vertical position of the indicated keyframe by 602 on the graph 603. A dot or some other indicator may be used on the line to correlate the current position on the graph with the current position within the space-time frame.

By this means, the viewer can see where any object of interest is in the film, can animate its movement within the frame and in association with other objects and environments, and use it as the anchor for a link that adds some metadata or annotation.

Figure 6B:
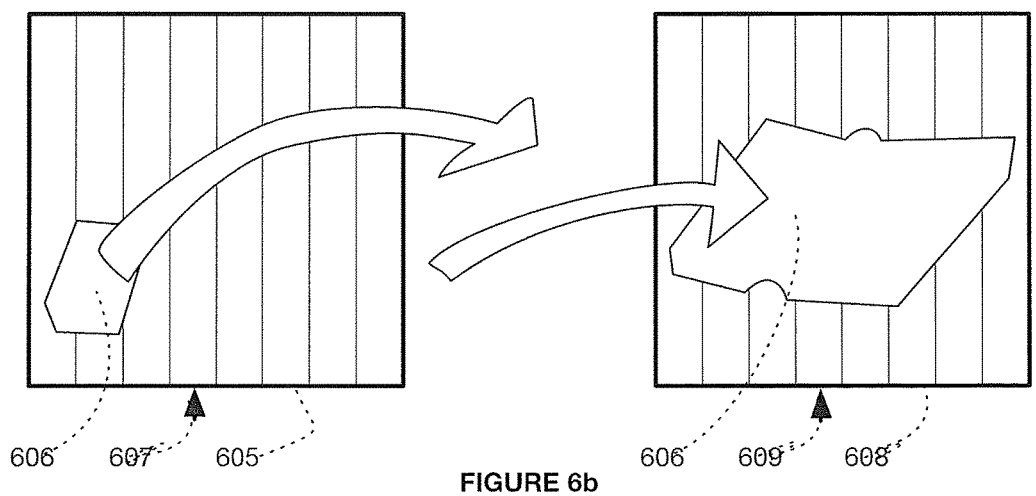

FIG. 6b indicates how the object can be traced so as to discriminate it from other objects and provide additional information about its nature. For example, in one state of a space-time frame 605, a user may have identified and marked a book, which appears in the footage—606 in the editing pane, not shown in FIG. 6. The book is displayed because the object also appears in the sequence covered by space-time frame 605 and in particular the keyframe associated with the highlighted space-time slice 607.

This book may have been identified or had its identity assisted with the help of the B-frame profile discussed in the context of 207 and 209 of FIG. 2. That is, the actual outline of the book may have created on the screen by:

- A user selecting the book in an editing frame (not shown in FIG. 6) and the B-frames associated with the book automatically (at step 213 of FIG. 2) finding the outline in that frame and all the contiguous ones in which the book appears.
- A user actually hand tracing the book in several frames and manually adjusting the tweening that is required. In other words, the user employs some vector animation software built into the system or provided by others.

The book is identified by some object recognition technique not described here, supplied by others and integrated into the system at step 209 of FIG. 2.

Regardless of how the outline is created to identify the book, it can now be included or excluded in what is displayed in the scrubber. And regardless if it is displayed as the outline, it can serve as an anchor for a link to metadata or annotations.

The right hand side of FIG. 6b shows either a later space-time frame or the same frame advanced to later in the film 608. In this frame, the book has been opened and the camera has zoomed in. All the discussion about the book in 605 applies here, with additional information. In the described system, the book has transformed in basic shape, appearance and color. Assuming that the transition occurs on screen, the function of steps 207 and 209 of FIG. 2 may have been sufficiently intelligent to carry the outline marking and link anchoring through the scene.

Regardless of whether the marking/outlining is performed manually, it is important for the system to note that a change has been made in the state of the object. Something caused this change and the change (because it is shown) is likely to cause other transformations.

The system is capable of internally handling situation theoretic representations. Generally, the notion of a typed link is supported, being displayed as a connecting line or shape. Typed links can include representations of transforming, causal dynamics. Many of these occur from events that can be seen in the film; others require external situations invoked by the viewer. This is an example of a transformation that occurs on screen.

Therefore, the display of the graph, shown as 603 in FIG. 6a carries extra information, being the display of an internal, transformative link. Any number of style conventions can be used to convey this additional role. An assumption is that they will use the same graphical convention used for causal links that originate or terminate outside the displayed area. FIG. 6a shows thickened lines with arrowheads. The shapes of these lines will still follow the convention shown in FIG. 6a, being the vertical location on the related keyframe.

Should the object be discontinuously shown because of an edit to another perspective in the same scene, or because the transformed object is shown in a later scene, then the link is semi-internal, being drawn outside of the frames.

Figure 6C:
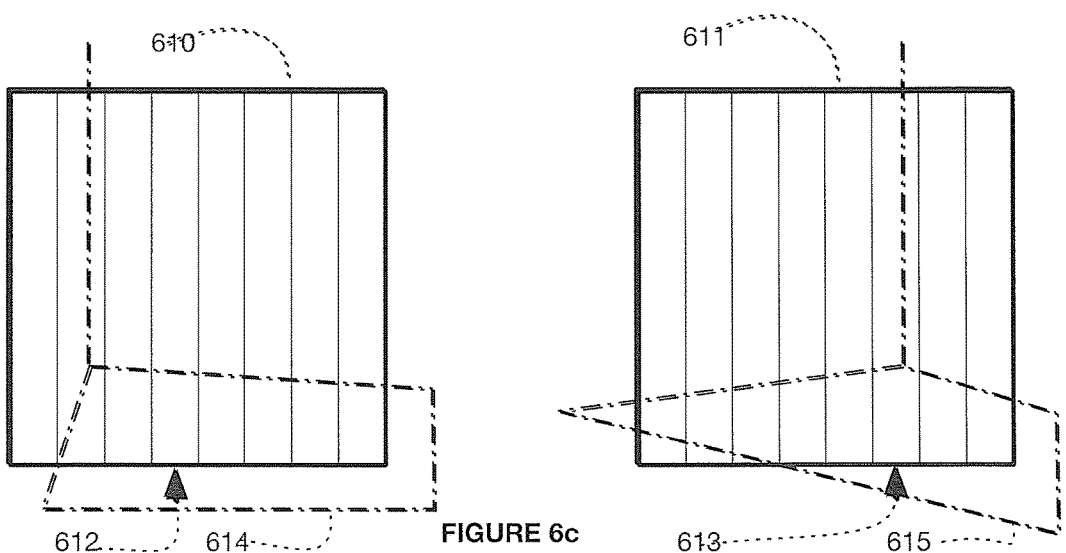

FIG. 6c illustrates the display of architectural or environmental features. The example background illustrated is a simple theatrical set of two walls and a floor, but any environmental feature can be displayed, including light and shadow. A distinction is made within the system between fact and situation. This often corresponds to objects (including actors) and physical environments. The system must be able to display both, and animate them in similar fashion, but manage them differently internally so to support situated reasoning and representation.

Space-time frames 610 and 611 represent space-time frames with the same environmental background, either two separate space-time frames or one space-time frame at a later state. The selected space-time slice 612, 613 is different.

In the example background—a simple theatrical set of two walls and a floor—the convention used in the figure has dotted lines to show environmental and architectural features. Shown in this case is a floor and two walls in the keyframe associated with slice 612. Any graphical convention can be used, but the user should immediately be able to distinguish between object and environmental overlays.

In this example, the shape of the floor 614, 615, indicates the existence and location of the walls.

Environmental marks are animated in the same way that objects are: as the selected space-time slice changes, the corresponding space-time slice in every space-time frame does also. That means that the environment from the associated keyframe changes. As with object indicators, environmental indicators can serve as anchors for annotations or metadata that is assigned, perhaps by typed links.

As with all figures regarding keyframes, space-time strips, frames and slices, the areas denoted will be displaying images from the video.

Figure 7:
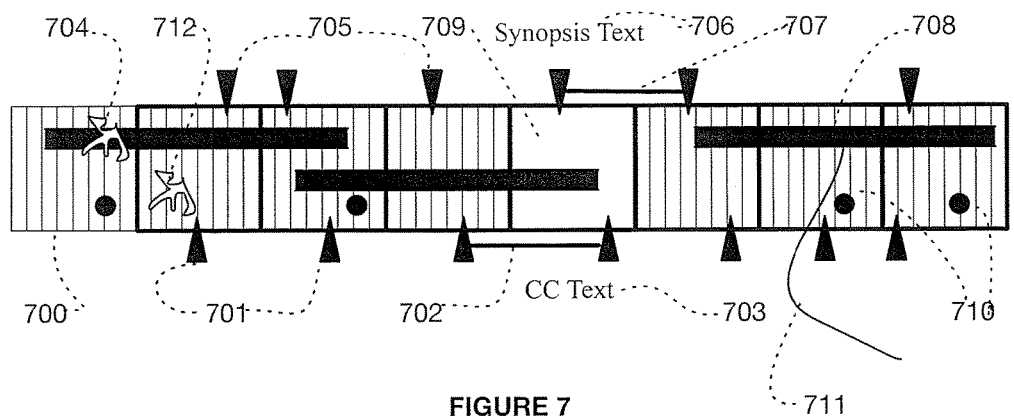
FIG. 7 illustrates an embodiment with time-related annotations and links.

FIG. 7 illustrates how annotation anchors in the scrubber work.

A primary design goal of embodiments of the invention is to allow a user to quickly browse annotations associated with the film, and see any of them in concert to support situated reasoning. This figure illustrates the different situation types and link anchors that can be used in an implementation. The graphical conventions used in the figure can be a wide variety of objects, using color, shape, animation and any means available. Placement above, below and within can be changed for clarity.

FIG. 7 illustrates the method of indicating segments of the film, using a portion of a space-time strip 700 in the figure. The preview frame is 709, wherein the selected keyframe is displayed. Below this keyframe is text 703, being text that captures the sound of what is happening. Typically, this is the closed caption text for hearing challenged viewers. The span of space-time slices that this text applies to is shown as a bar 702, between closed caption markers 701. These markers denote the segments of the film that have discrete closed caption phrases.

Similarly, the text above may display a phrase from a detailed synopsis of the film. The bar 707 indicates the segment of the film to which that phrase applies. Markers 705 show the other segments to which synopsis text fragments apply.

Scenes in films are often broken into cuts, where the camera view changes. These are denoted in this example by dots 710 in the main body of the scrubber.

As a result, the system presents three ways of assisted selection of relevant sections: by what is said; by what happens according to the synopsis; and by what the camera sees before changing. The user can also make a selection of any length. Typically this is by placing the cursor or selector in the scrubber at one end of the desired selection and dragging to the other end. These selections are shown as 708 and can be ordered (and otherwise styled) by the system automatically or the user manually.

The user can also place symbolic markers which both convey location and some meaning in addition to the styles used in the markers/anchors. FIG. 7 shows two such glyphs, one marking a keyframe 712 and the other a selection 704.

The text above and below can have information about the location of the keyframe in the film, showing the absolute number in a sequence, the time from the beginning and end and so forth. Alternately, this information can be conveyed at another location or in a panel.

All of the display dynamism described in FIG. 5 can be active. It is important to note that an advantage of embodiments of the invention that every space-time slice maintains time integrity as scrubbing occurs, or as various markers are created, displayed and hidden.

Anchors as displayed in FIG. 7 can be shown simultaneously with the object/environment markers/anchors of FIG. 6. In a typical implementation, there are a great number of both types (time-related and causal-related), and the viewer will be filtering and togging among them for optimum value.

The markers shown in FIG. 7 are drawn on the scrubber itself, but there is no requirement that this be so. These markers can be placed above and/or below.

An implementation can control the level of annotation detail by determining where the vertical position of the cursor (or selector) is on the scrubber. Moving the cursor left and right moves back and forth in time as usual. Moving the cursor up and down in this implementation would control details like whether or how much annotation anchor detail is shown. Similarly, it may control the some aspects related to the preview pane and associated zooming in its temporal vicinity.

FIG. 6 illustrates the other primary type of anchor, being onscreen objects and environments. FIG. 7 displays various time-related markers. Anchors of FIG. 6 are concerned with the content of the film. These can be used in conjunction with annotating explicit items: plot points, objects, actors, characters, environments and so one. But they can also be used to indicate 'softer' qualities: tension, causality, cinematic effects and so on. The graphical conventions of FIG. 6 are intended to be extended as required, using rules based on a graphical syntax unique to the implementation.

Such extensions will likely include camera position and attitude. The graphical syntax may be based on a previsualization graphical vocabulary, and possibly informed by previsualization work.

All of the anchors in FIGS. 6 and 7 are intended to be one end of an explicit typed link. A typed link can be as simple as a line with a name. It can be a relation where two elements (the beginning and end of the link) are related by a set of relations that constrain the ontologies of both ends and adds semantic value to the assembly.

A typed link may conform to emerging and existing standards, for example OWL and RDF. Typed links can also be all of these. In addition a typed link may be a function which takes as its input the originating element of the link, and produces as the result the terminating element. Functions can be used extensively in the coding of an implementation of the system of FIG. 2. But they are also useful for modeling causal phenomenon. There are at least two levels where this applies.

One level concerns the events in the story or stories of the film, whether the film is fiction or not. In this case, the typed link supports qualities such as causal succession or suggestion of outcomes. A second level is the 'story' of the viewer (user) in consuming and interpreting the film. This second level may be modeled using a causally aware narrative modeling system based on situation theory such as described in U.S. patent application Ser. No. 14/093,229, filed on Nov. 23, 2013, and incorporated by reference herein.

Figure 8:
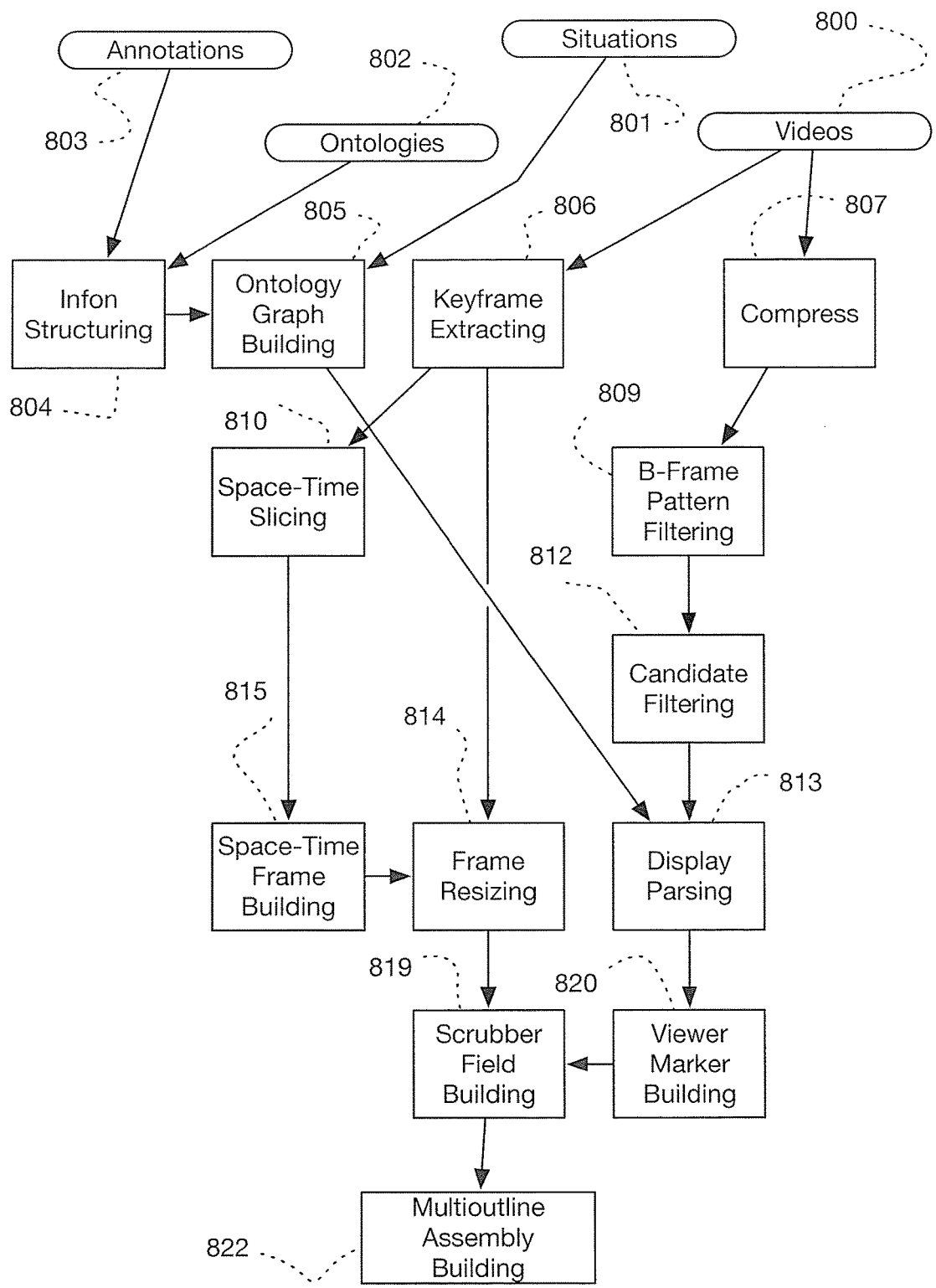
FIG. 8 illustrates an embodiment with reactive flow.

The display of links at any level may be as a simple line, as shown at 711 of FIG. 7. But the visual display of links could be used to communicate some essential nature of the link, what it does and how it is situated. This may be accomplished by various styles (thickness, color . . . ) but the system is well suited to having the form and shape of the line have syntax as well FIG. 8 illustrates the general nature of reactive functions. Functional programming in general and functional reactive programming in particular are particularly useful for applications such as described here for two reasons. The first is that the focus data type is a film, which presents in normal mode as streaming media. The scrubber design in its particulars can be adapted to any kind of streaming data, including for example combined sensor data in situations that has no meaningful beginning and end.

Modeling of processes within the body at the microbiological level are often fruitfully modeled using reactive functions.

FIG. 8 shows an example of the second advantage of reactive functions as used in collaborative film annotation which may be employed. FIG. 8 has some selected components from the system diagram of FIG. 2, with the spatial location of elements maintained for simplicity.

As an example, suppose the video at 800 is 'Memento,' a film from 2000, that is constructed in a non-linear fashion. It can be interpreted several different ways depending on various inputs: what the viewer knows before watching, what sort of things they look for and so on.

Suppose also that the scrubber is used to annotate the film as it is playing and being interpreted by several different users.

The situation changes over time as the actual film plays. So changes at 800, produce change in the chain of processes displayed in the figure as steps 800, 806, 810, 815, 814, 819, 822 for example, each new keyframe providing new interpretive information. 'Memento' is a particular challenge because some of the scenes are presented in reverse order; the effects of certain key plot triggers will have been seen before the triggering scene appears.

As the film progresses, the facts 803 that will be appearing over time grow. Some of them change as new information is received and interpretations developed and modified by a single viewer. So the chain of steps 803, 804, 805, 813, 820, 819, 822 has to be similarly reactive. So far, this and the above are supportable by the current art, for example by Reactive Cocoa for AppleTV and iOS devices as described by Ash Furrow in 'Functional Reactive Programming on iOS', 2013.

The system also supports dynamic functions in the function chain where situations reinterpret facts. This functional chain is illustrated by 801, 805, 813, 820, 822. An example of when this occurs is when an analyst is considering the different ways, say four different viewers are interpreting the film as they experience it. Those four each will have come with a different background, different knowledge and different interpretive tools. As our analyst moves from considering one to another, situations in 801 will change and influence the entire reactive chain.

Figure 9:
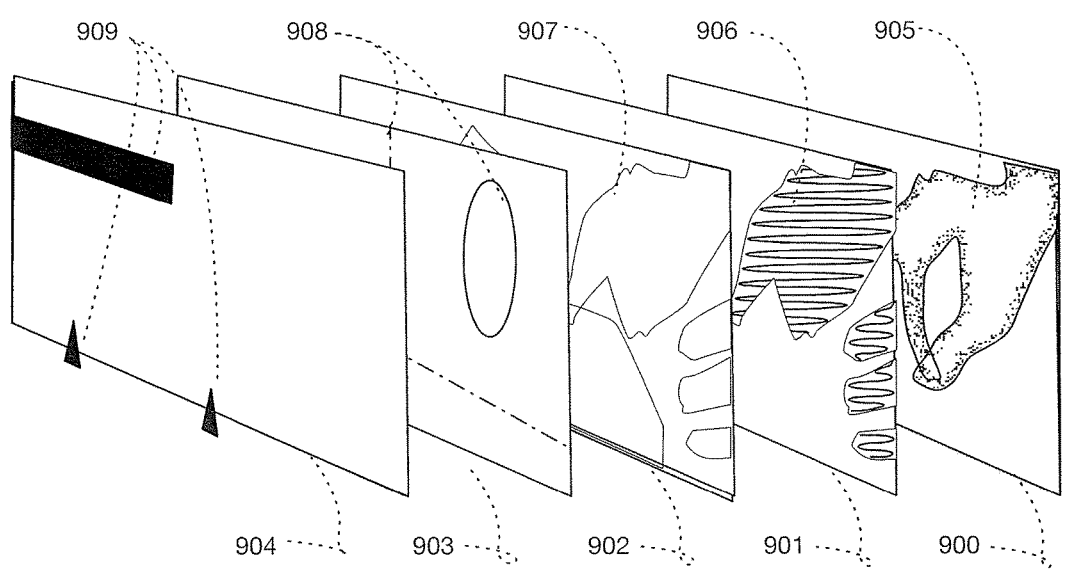
FIG. 9 illustrates an embodiment with layered display.

FIG. 9 illustrates an implementation with layering. Building graphical layers on top of one another provides for economies in the programming and web delivery (if that is the means). It also aids the reactive architecture if such is being used, because it pushes the separation of functions to the end of the chain. FIG. 9 shows a key frame on top of a space-time slice grid, as illustrated in 709 for FIG. 7.

Layer 900 is the layer that contains the raster image of the keyframe from the video. That frame has an image of a human hand 905 on the right side. 901 is the layer that has extracted relevant B-frames. 906 of layer 901 is the B-frame that has identified the hand at steps 209, 212 of FIG. 2. This layer is normally not viewed and is toggled on when the user wants some assistance in identifying objects.

Layer 902 displays the outline of the hand 907. Layer 903 displays object, object path and environmental notation 908. Layer 904 is where the time-related markers 909 are drawn.

Any element of any layer can be toggled on and off. This filtering is controllable by the user, as assisted by clever algorithms.

FIG. 10 illustrates an advantage of having objects identified by automatic edge detection and user refinement. FIG.

6 illustrates the display of an object at its correct location in the space-time frame. FIG. 10 illustrates how display of objects can be triggered by moving a pointing device over the space-time frame, to allow opportunistic browsing of objects within a film.

Figure 10A:
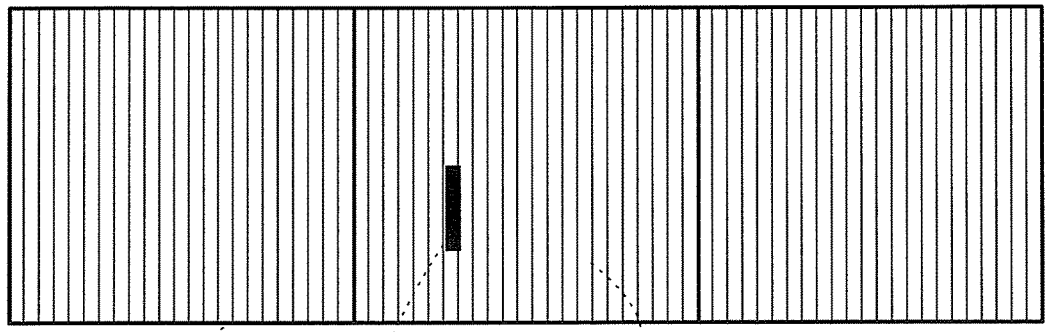
FIGS. 10a, 10b and 10c illustrate an embodiment with automatic highlighting of features.

FIG. 10a illustrates a space-time strip 1000, similar to space-time strips 500 (FIG. 5a) and 700 (FIG. 7). Three space-time frames 1001 are illustrated. Within a slice is illustrated a portion of an object 1002 that is partially visible. The illustration shows as 1002 a portion of an eagle that is contained within the appropriate keyframe. Many such object portions will be visible in the space-time strip 1000, representing different locations of the same object, or other objects.

Figure 10B:
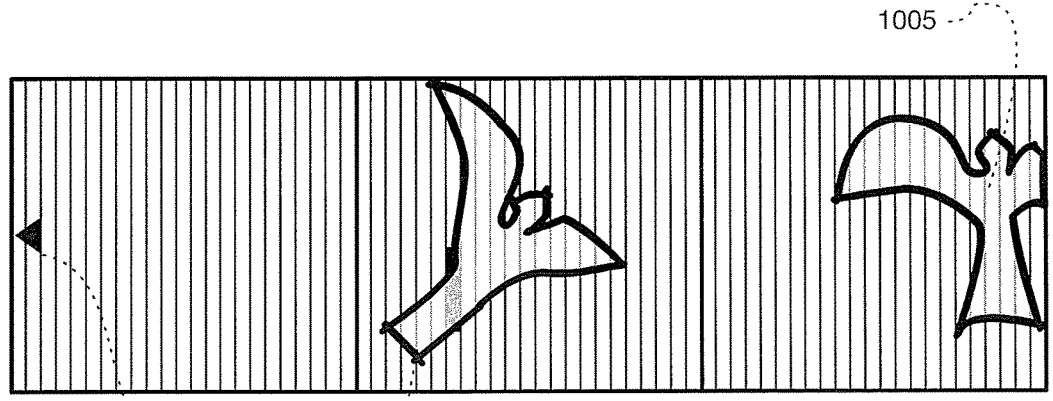

When this mode is active, moving a pointing device over the area 1002 will cause the associated object to be drawn as it is on the relevant keyframe. FIG. 10b illustrates this. An outline of the object, for example an eagle 1004 is superimposed on the space-time frame as it would appear in the keyframe. If the same object appears at the same relative location in adjacent space-time frames, then it is, as shown at 1005.

Should the object appear in space-time frames that are not visible, an indication 1003 is shown.

A control can be implemented that toggles affordances. For example, a click or similar selection command can make the object draggable. In this manner, one can scrub the video in the space-time strip 1000 and see the selected object, or if the mode is toggled, one can drag the object through its transformations and path and have the space-time strip change.

Figure 10C:
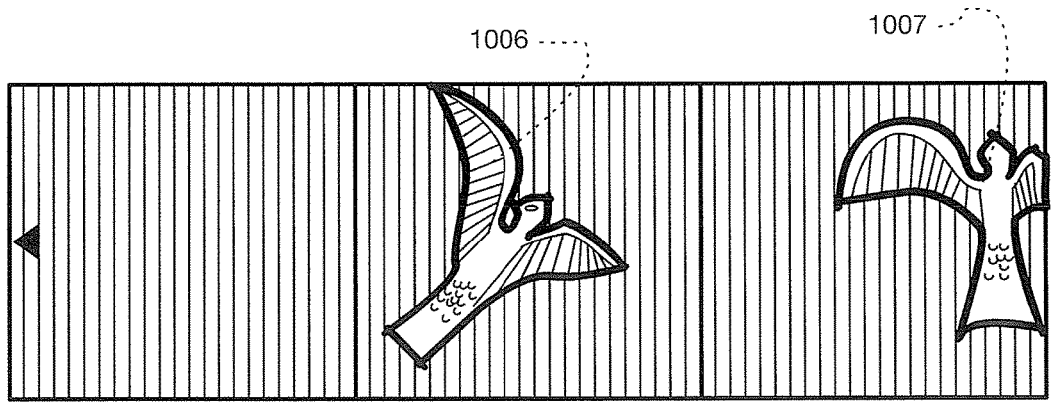

FIG. 10c shows an example state change when toggled. The eagle's representation has gone from the outline of 1004 and 1005 to the actual screen object as it appears on the film 1006 and 1007.

When an object is displayed, the system has the capability to know what it is and what role it plays in the story, as a result of the binding of the knowledge base, the elements of the film and the user affordances as illustrated in FIG. 2.

What is claimed as new and desired to be protected by Letters Patent of the United States is:

1. A computer system for collaborative annotation of video, the computer system comprising:
    a video processing system for processing the video, the video processing system comprising a processor configured to extract a plurality of key frames from the video, to slice the key frames into vertical slices each having a uniform thickness and to combine the slices to create a plurality of space-time frames such that each slice occupies the same position in the respective space-time frame that it occupied in the respective key frame;
    a knowledge management system for managing information associated with the video, and for providing the information to the video processing system, the information comprising a plurality of annotations, each of said plurality of annotations being associated spatially and temporally with at least one of the plurality of space-time frames; and
    a graphical display for displaying the plurality of space-time frames in a scrubber and for displaying the plurality of annotations such that each of the plurality of annotations is displayed concurrently with each respective at least one of the plurality of space-time frames,
    wherein in the knowledge management system comprises a data store having ontology information about the video,
    wherein at least one of the plurality of annotations is one end of a typed link,
    wherein the typed link represents that the annotation and an anchor in the video are related by a set of relations that constrain the ontologies of both the annotation and the anchor, and adds semantic value to the relationship.

2. The computer system of claim 1, wherein the processor is further configured to compress the video.

3. The computer system of claim 1, wherein the processor is further configured to annotate the plurality of space-time frames with information received from the knowledge management system.

4. The computer system of claim 3, wherein the video processing system provides the annotated plurality of space-time frames to the graphical display for display and manipulation of the annotated space-time frames by a user.

5. The computer system of claim 1, further comprising a user input device for allowing a user to add annotations to the plurality of space-time frames.

6. The computer system of claim 1, wherein the knowledge management system is configured to reinterpret the plurality of annotations upon receipt of new information.

7. A method for collaborative annotation of video, the method comprising:
    receiving in a video processing device a video stream;
    extracting from the video stream a plurality of key frames;
    slicing the key frames into vertical slices each having a uniform thickness;
    combining the slices to create a plurality of space-time frames such that each slice occupies the same position in the respective space-time frame that it occupied in the respective key frame;
    providing information from a knowledge management system to the video processing device, the information comprising a plurality of annotations, each of said plurality of annotations being associated spatially and temporally with at least one of the plurality of space-time frames; and
    displaying on a graphical display the plurality of space-time frames and the information in a scrubber such that each of the plurality of annotations is displayed concurrently with each respective at least one of the plurality of space-time frames,
    wherein in the knowledge management system comprises a data store having ontology information about the video,
    wherein at least one of the plurality of annotations is one end of a typed link,
    wherein the typed link represents that the annotation and an anchor in the video are related by a set of relations that constrain the ontologies of both the annotation and the anchor, and adds semantic value to the relationship.

8. The method of claim 7, further comprising annotating the plurality of space-time frames with information received from the knowledge management system.

9. The method of claim 7, further comprising manipulating an input device to add annotations to the space-time frames.

10. The method of claim 8, further comprising manipulating by a user the annotated space-time frames.

11. The method of claim 7, further comprising reinterpreting the plurality of annotations upon receipt of new information.

\* \* \* \* \*